(12) United States Patent 
Karwath

(10) Patent No.: US 7,902,776 B2
(45) Date of Patent: Mar. 8, 2011

(54) METHOD AND ARRANGEMENT FOR SENSORLESS OPERATION OF AN ELECTRONICALLY COMMUTATED MOTOR

(75) Inventor: Arno Karwath, Deisslingen (DE)

(73) Assignee: EBM-PAPST St. Beorgen GmbH and Co. KG, St. Beorgen (DE)

( * ) Notice: Subject to any disclaimer, the term of this patent is extended or adjusted under 35 U.S.C. 154(b) by 435 days.

(21) Appl. No.: 11/690,890

(22) Filed: Mar. 26, 2007

(65) Prior Publication Data

US 2007/0241705 A1    Oct. 18, 2007

(30) Foreign Application Priority Data

Mar. 24, 2006   (DE) .......................... 10 2006 014 520

(51) Int. Cl.
*H02P 6/16*      (2006.01)
(52) U.S. Cl. ................ 318/400.07; 318/432; 318/400.22
(58) Field of Classification Search .................. 318/432, 318/400.07, 400.22, 400.29
See application file for complete search history.

(56) References Cited

U.S. PATENT DOCUMENTS

| | | | | |
|---|---|---|---|---|
| 4,651,068 A | * | 3/1987 | Meshkat-Razavi | 318/400.02 |
| 4,710,684 A | | 12/1987 | Okita et al. | 318/254 |
| 4,901,366 A | * | 2/1990 | Rottger | 388/811 |
| 5,583,404 A | * | 12/1996 | Karwath et al. | 318/400.14 |
| 6,028,406 A | | 2/2000 | Birk | 318/254 |
| 6,452,349 B1 | * | 9/2002 | Hahn et al. | 318/400.22 |
| 6,906,486 B2 | * | 6/2005 | Berroth et al. | 318/400.29 |
| 2005/0253546 A1 | | 11/2005 | Dornhof | 318/439 |

FOREIGN PATENT DOCUMENTS

| | | |
|---|---|---|
| DE | 196 28 585 C2 | 1/1998 |
| JP | 10-257 792 A | 9/1998 |

* cited by examiner

*Primary Examiner* — Rina I Duda
(74) *Attorney, Agent, or Firm* — Milton Oliver, Esq.; Oliver Intellectual Property LLC

(57) ABSTRACT

An improved electric motor has a rotor (124), a stator (125) having at least one phase winding strand (126), an output stage (122) for influencing the current flow in said phase winding strand, a DC link circuit (170) for supplying the output stage (122) with current, including a link circuit capacitor (178), and a control unit (132) having an arrangement (152) for sensing a value characterizing the current recharge into the link circuit capacitor (178), which control unit (132) is configured to specify commutation instants as a function of the sensed value, and to perform commutation operations in the power stage (122) at the commutation instants thus specified. Avoiding a need for prolonged "currentless intervals" permits achieving higher efficiency and power output, particularly in a motor having less than three winding phases.

31 Claims, 7 Drawing Sheets

METHOD AND ARRANGEMENT FOR SENSORLESS OPERATION OF AN ELECTRONICALLY COMMUTATED MOTOR

CROSS-REFERENCE

This application claims priority of German Application 10 2006 014 520.8 filed 24 Mar. 2006, the entire content of which is hereby incorporated by reference.

FIELD OF THE INVENTION

The invention relates to a method and an arrangement for sensorless operation of an electronically commutated motor (ECM).

BACKGROUND

DE 10 2005 020 737 and corresponding U.S. application Ser. No. 11/127,856, DORNHOF, published as US 2005-025, 3546-A, describe a method of sensorless operation of an electronically commutated motor having at least two phase winding strands, in which motor the voltage, induced in the non-energized stator phase winding strand of the stator, i.e. the strand not experiencing current flow at the moment, is differentiated, in order to generate a control signal for controlling commutation of the motor. Since, in stator winding arrangements having two strands, and in general in multistrand stator windings, the stator winding strands never all experience current flow simultaneously, the sensing, of the zero transition of the induced voltage necessary for generation of the control signal, can always occur in a stator phase winding not experiencing current flow at the moment. This sensing requires, however, a relatively large outlay in terms of circuit engineering.

In a single-phase-winding motor, furthermore, current flow in the single stator phase winding strand must be discontinued during the expected zero transition of the induced voltage for a sufficiently long period of time to enable sensing of that zero transition. The result of such current-flow gaps is, however, to reduce the efficiency and maximum power of the motor.

SUMMARY OF THE INVENTION

It is an object of the present invention to enable improved sensorless commutation in electric motors having a single-phase winding strand. These motors are commonly, though somewhat inaccurately, called "single phase motors."

The invention is based on the recognition that the induced voltage, that occurs at each commutation of an ECM in the stator winding thereof, influences a recharge current that is recharged into a DC link circuit associated with the ECM. Sensing of this recharge current thus allows an inference as to the induced voltage, and can accordingly be used to determine and specify suitable points in time for the commutation of the ECM. With optimum commutation, this recharged current is minimal, over time and/or absolutely (e.g. maximum current magnitude or integral of the current magnitude over time). Application of this principle is not, however, limited to a specific type of motor.

BRIEF FIGURE DESCRIPTION

Further details and advantageous refinements of the invention are evident from the exemplifying embodiments, in no way to be understood as a limitation of the invention, that are described below and depicted in the drawings.

Figure 1:
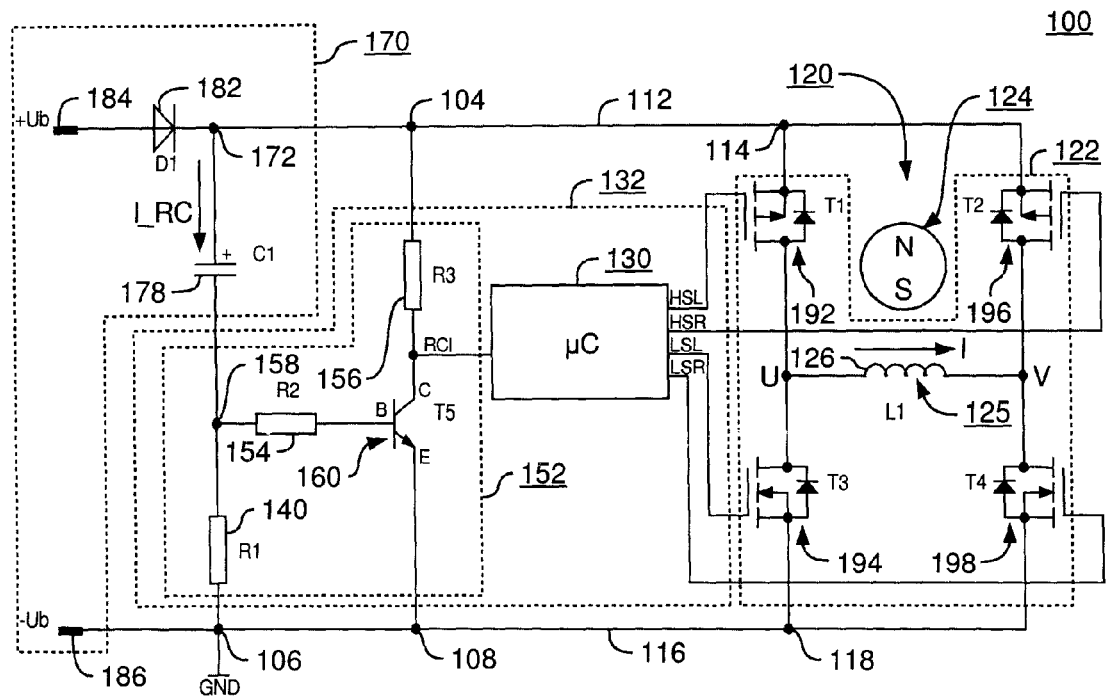
FIG. 1 is a simplified circuit diagram of an apparatus for sensorless commutation of an electronically commutated motor (ECM), according to a first embodiment of the invention.
Figure 2:
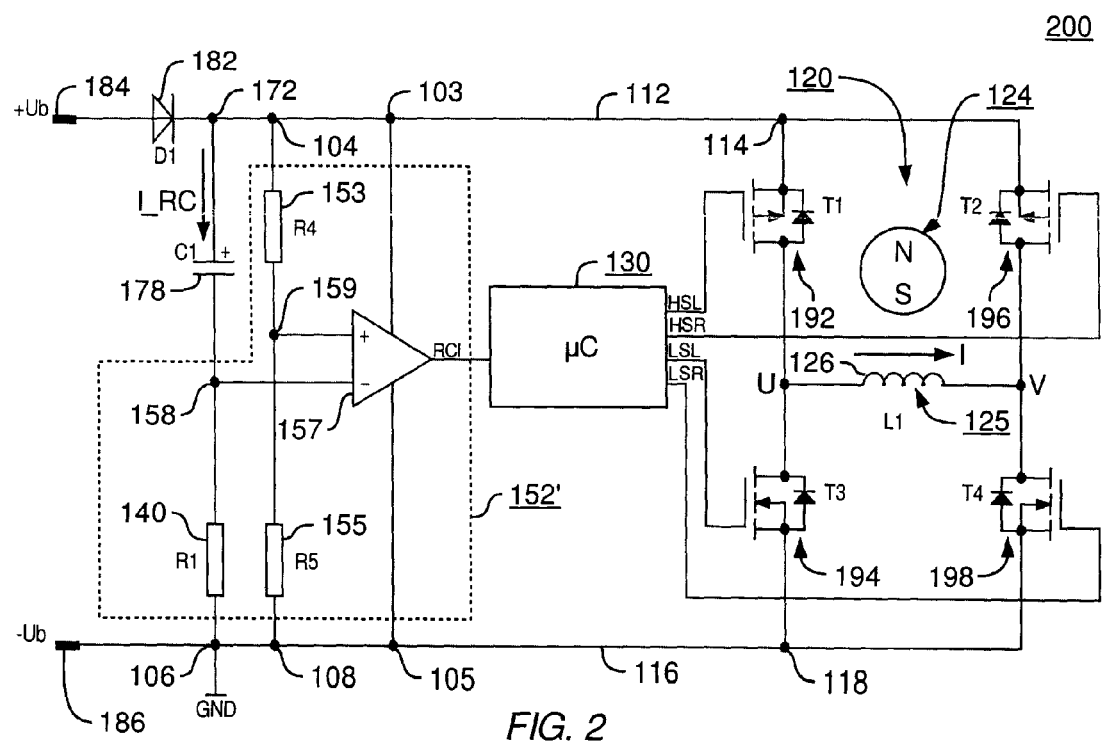
FIG. 2 is a simplified circuit diagram of an apparatus for sensorless commutation of an ECM, according to a second embodiment of the invention.
Figure 3:
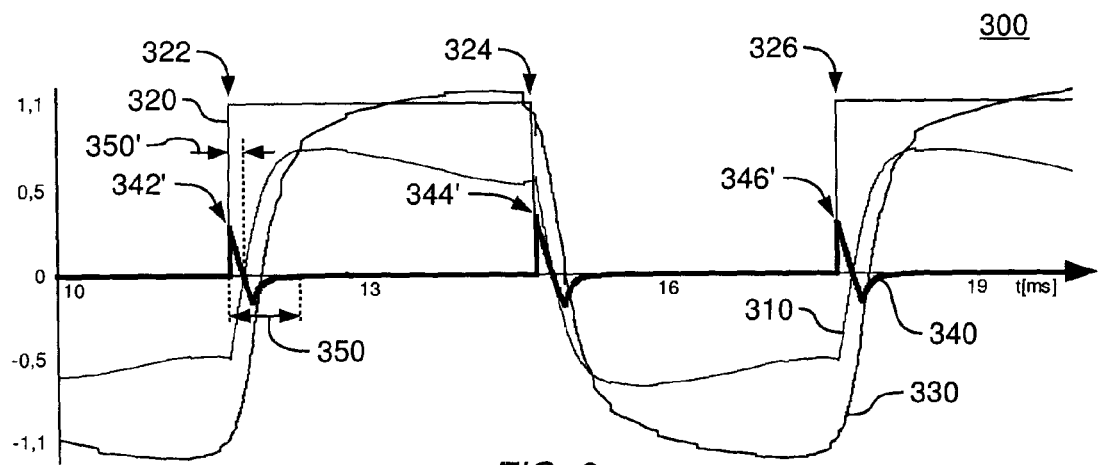
Figure 4:
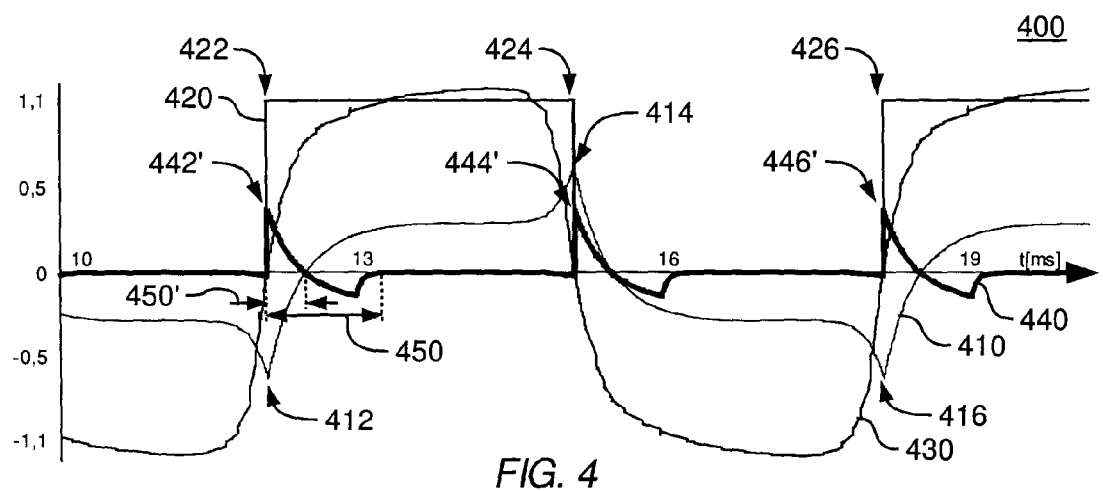
Figure 5:
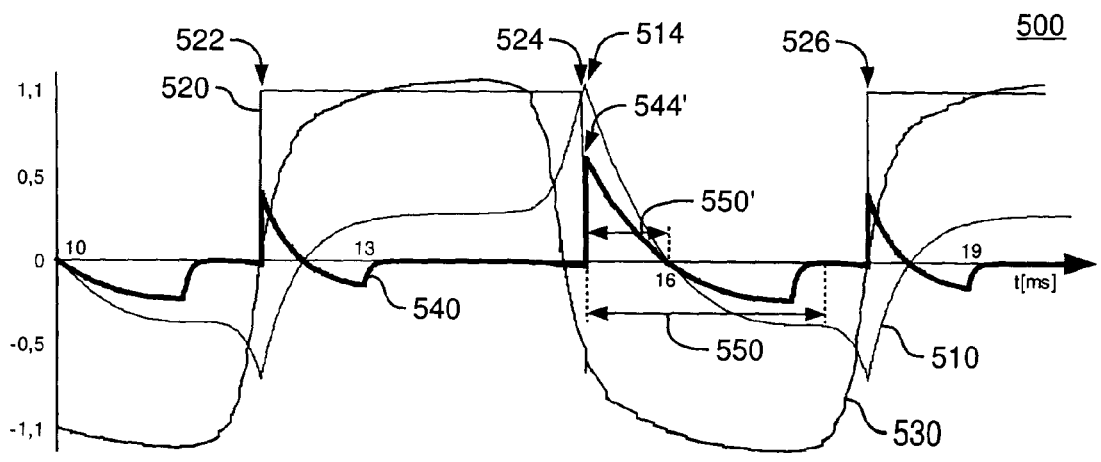
Figure 6:
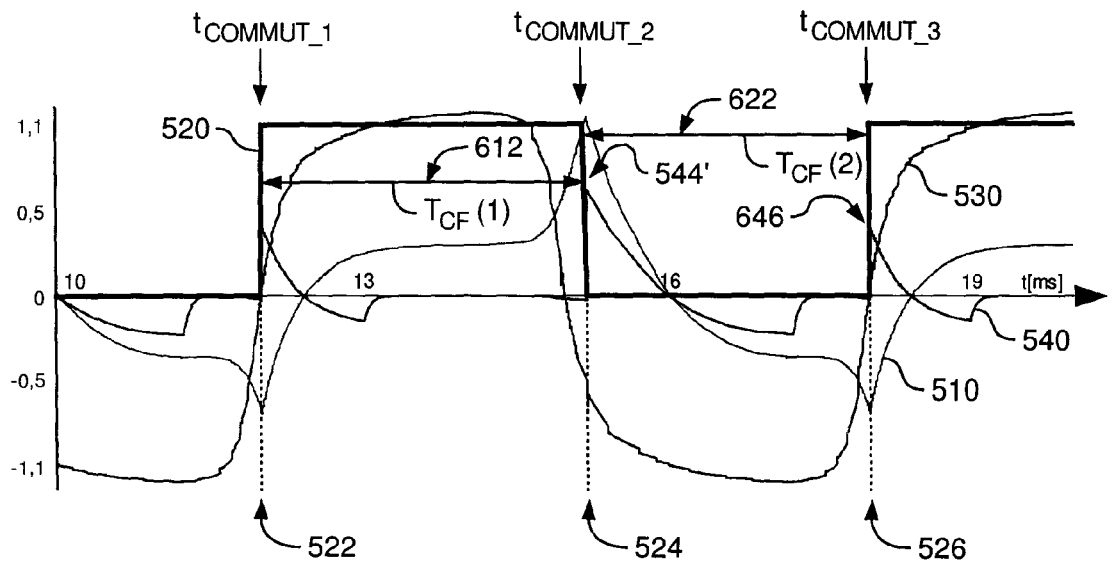
Figure 7:
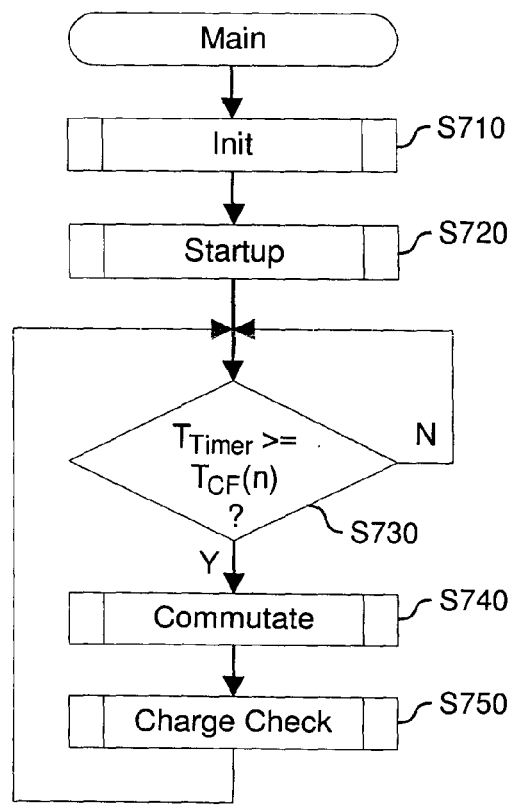
Figure 8:
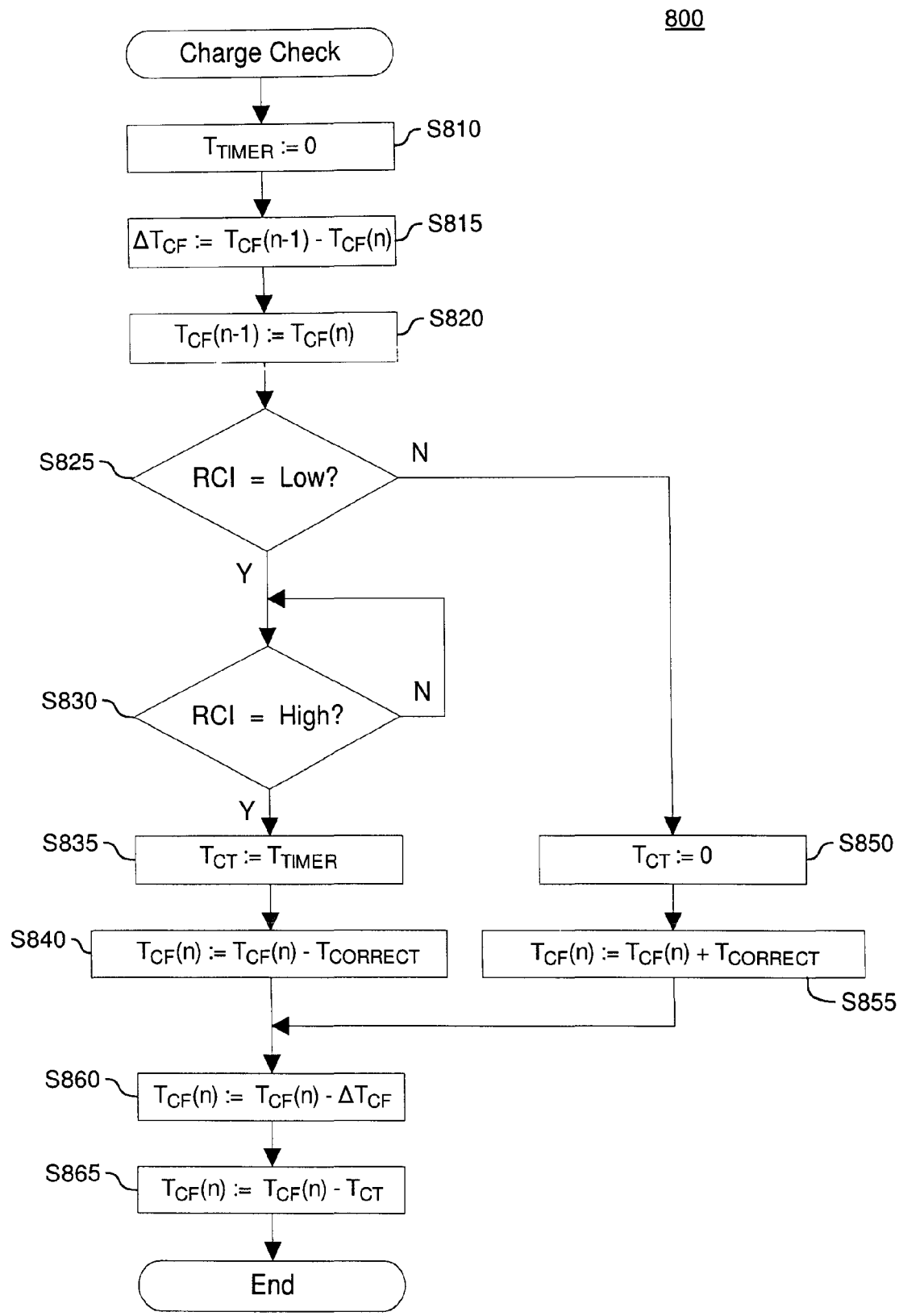
Figure 9:
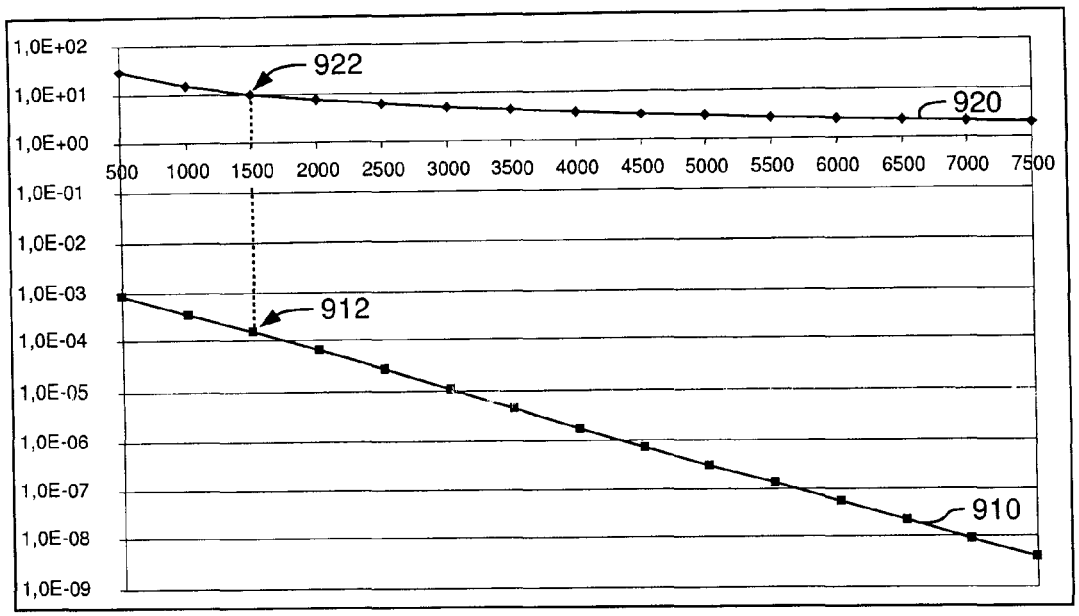
Figure 10:
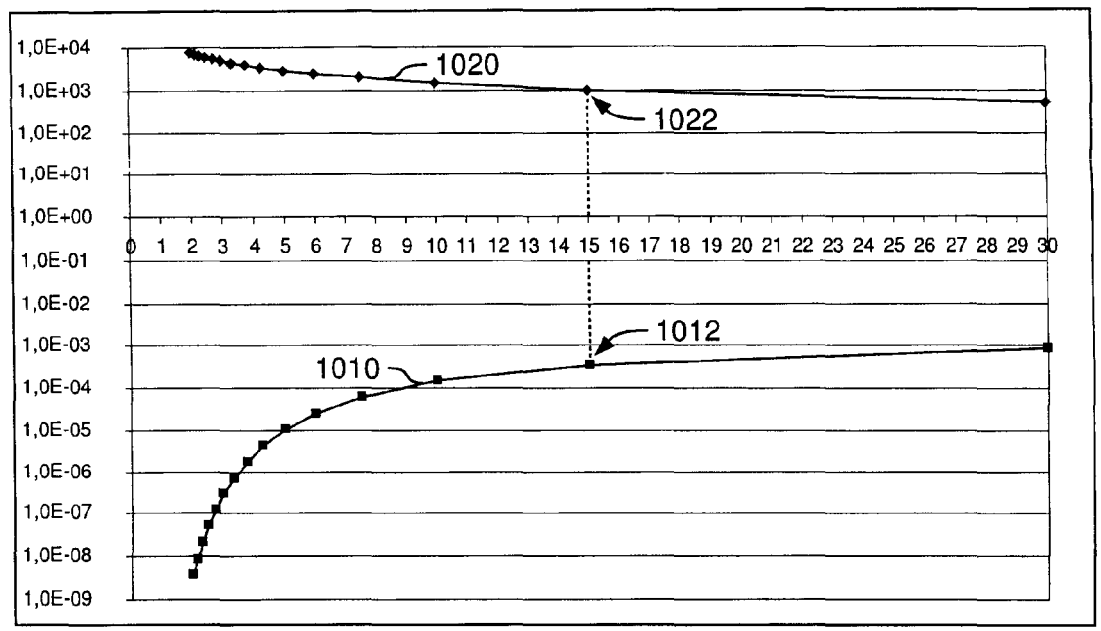
Figure 11:
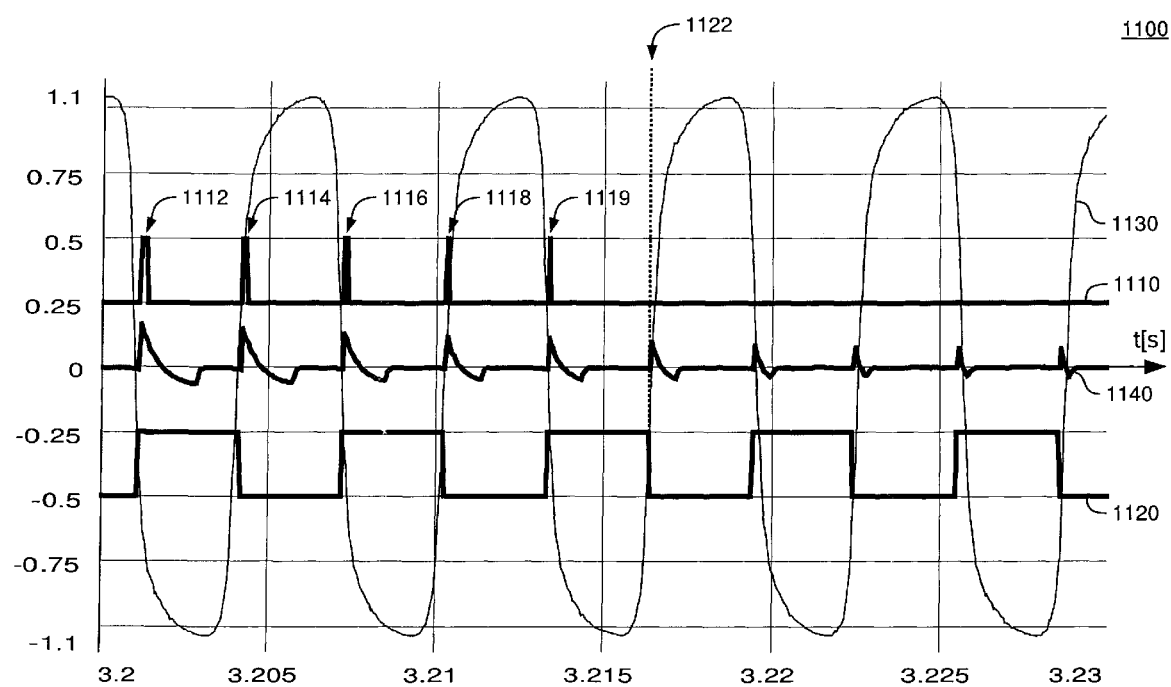
Figure 12:
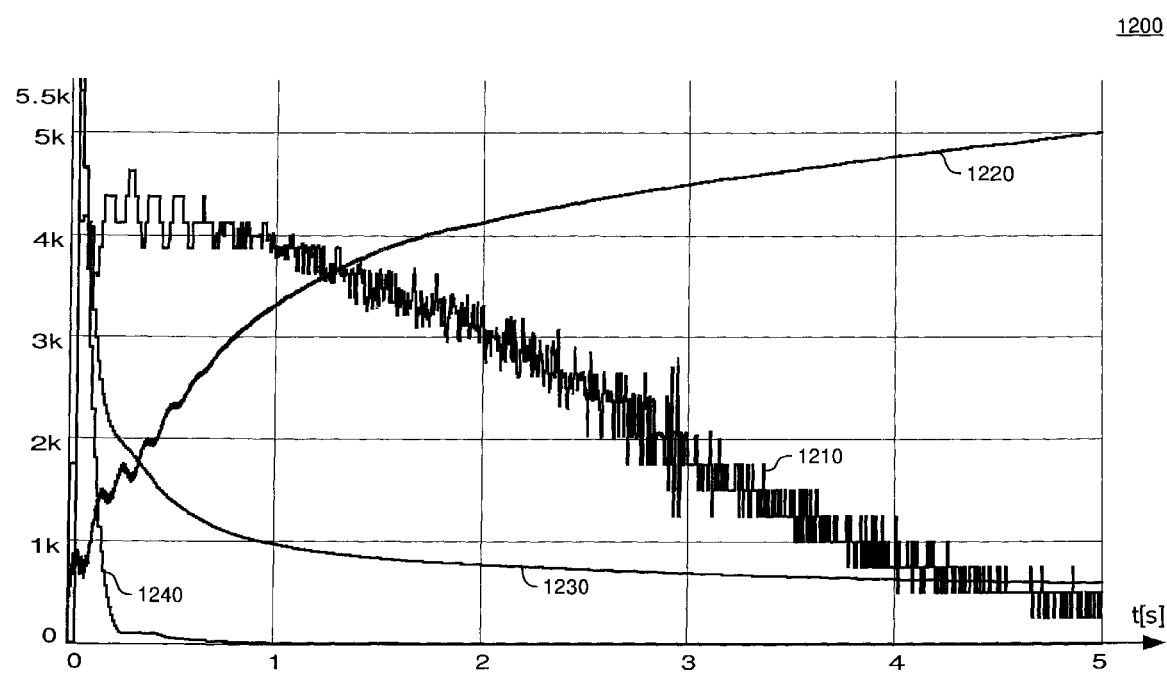

FIG. 3 schematically depicts various operating parameters of the apparatus of FIG. 1 or 2 in a context of optimum commutation;

FIG. 4 schematically depicts various operating parameters of the apparatus of FIG. 1 or 2 in a context of delayed commutation;

FIG. 5 schematically depicts various operating parameters of the apparatus of FIG. 1 or 2 in a context of greatly delayed commutation;

FIG. 6 shows what is schematically depicted in FIG. 5, with the commutation status emphasized;

FIG. 7 is a flow diagram of a method for operating the apparatus of FIG. 1 or 2, according to an embodiment of the invention;

FIG. 8 is a flow diagram of a method for determining suitable commutation instants, according to an embodiment of the invention;

FIG. 9 schematically depicts a correction variable used to determine suitable commutation instants;

FIG. 10 schematically depicts the correction variable of FIG. 9;

FIG. 11 schematically depicts various operating parameters of the apparatus of FIG. 1 or 2 in a context of optimization of the commutation instants; and FIG. 12 schematically depicts various operating parameters of the apparatus of FIG. 1 or 2, upon ramp-up of the ECM.

DETAILED DESCRIPTION

In the description that follows, the terms "left," "right", "top," and "bottom" refer to the respective Figure of the drawings and can vary from one Figure to the next depending on an orientation (portrait or landscape) selected in each case. Identical or identically functioning parts are labeled with the same reference characters in the various figures, and are usually described only once.

FIG. 1 is a simplified circuit diagram that schematically illustrates the functioning of an apparatus 100 for operating an ECM 120. Apparatus 100 is implemented to enable sensorless operation of ECM 120 with improved commutation, and comprises ECM 120, a power stage 122, a control unit 132, and a DC link circuit 170. ECM 120 is preferably implemented to drive a fan but may, of course, be used for other purposes as well.

According to an embodiment of the present invention, ECM 120 comprises a rotor 124 and a stator 125 having at least one stator phase winding strand 126. Rotor 124 is, for example, a permanent-magnet rotor having one or more pole pairs. Stator 125 is preferably embodied in single-phase-winding fashion, i.e. with one stator phase winding strand 126 (L1). A different number of phase winding strands would also be possible. Stator phase winding strand 126 has two terminals U and V through which stator phase winding strand 126 is connected to power stage 122.

Power stage 122 serves to influence the current in stator phase winding strand 126, and is connected on one side via a node 114 to a lead 112, and on the other side via a node 118 to a lead 116 connected to ground (GND). Via leads 112 and 116, a supply voltage $U_b$ is delivered to power stage 122 from DC link circuit 170.

DC link circuit 170 is depicted in FIG. 1 only schematically, having two terminals 184, 186, a diode 182 (D1) and a link circuit capacitor 178 (C1). The positive pole $+U_b$ of supply voltage source $U_b$ is applied to terminal 184 connected to lead 112, and its negative pole $-U_b$ is applied to terminal 186 which is connected to lead 116. Diode 182 (D1), which is connected at its anode to terminal 184 and at its cathode to a node 172, serves on the one hand as a polarity protector and, on the other hand, prevents a recharge current I_RC, generated by the ECM, from flowing back into DC voltage source $U_b$. A recharge current I_RC of this kind thus causes charging of capacitor 178.

Power stage 122 is preferably implemented as a full bridge circuit (H-bridge) having four semiconductor switches 192 (T1, p-channel type), 194 (T3, n-channel type), 196 (T2, p-channel type), 198 (T4, n-channel type) that are depicted, by way of example, as field-effect transistors having freewheeling diodes. Semiconductor switches 192, 194 form a first half-bridge and are connected to terminal U of stator phase winding strand 126, terminal V of which is connected to semiconductor switches 196, 198 which form a second half-bridge. Semiconductor switches 192, 194, 196, 198 are connected to control unit 132, and are controlled by it in order to commutate the motor current.

Control unit 132 comprises a microprocessor 130 (μC) and an arrangement 152 for sensing the charge state of link circuit capacitor 178, which latter is arranged between node 172 and a node 158. Suitable microprocessors are available from Microchip of Chandler, Ariz. and other microprocessor manufacturers. Arrangement 152 encompasses a resistor 140 (R1), an npn transistor 160 (T5) in an emitter circuit, and two resistors 154 (R2) and 156 (R3). Resistor 140 is connected to node 158 and to a node 106 in lead 116. Base terminal B of transistor 160 is likewise connected to node 158 via resistor 154; its collector C is connected via resistor 156 to a node 104 in lead 112, and its emitter E is connected to a node 108 in lead 116. Microprocessor 130 is connected on the input side to the collector of transistor 160, and receives therefrom a signal RCI (recharge indicator) that characterizes the charge state of link circuit capacitor 178. On the basis of signal RCI, microprocessor 130 generates commutation signals HSL, HSR, LSL, LSR for power stage 122. These signals are applied to semiconductor switches 192, 196, 194, 198 in order to produce commutation operations in power stage 122 at predetermined commutation instants.

Operation

When apparatus 100 is in operation, ECM 120, after being switched on, is first ramped up to a predetermined minimum rotation speed that is necessary to enable execution of the described method for specifying suitable commutation instants, as a function of the charge state of link circuit capacitor 178. This minimum rotation speed is preferably reached, after switching-on, by a forced commutation of stator phase winding 126 with a decreasing current-flow duration, so that ECM 120 is initially accelerated in a stepping-motor mode.

Commutation signals HSR, LSL, HSL, LSR generated by control unit 132 for the commutation of ECM 120 preferably assume the logical state "HIGH" or "LOW." Commutation signal HSR ("high side right") serves to control semiconductor switch 196, LSL ("low side left") to control semiconductor switch 194, HSL ("high side left") to control semiconductor switch 192, and LSR ("low side right") to control semiconductor switch 198.

At each commutation, commutation signals HSR, LSL, HSL, LSR are, as a rule, generated in such a way that those semiconductor switches 192 to 198 that are conducting, become switched off; and those semiconductor switches 192 to 198 that are switched off, become conducting. For example, in the context of a first commutation operation at a first commutation instant $t_{COMMUT\_1}$, firstly commutation signal HSL is toggled from "LOW" to "HIGH" and commutation signal LSR is toggled from "HIGH" to "LOW." Semiconductor switches 192 and 198 are thereby switched off, interrupting delivery of current from DC link circuit 170 in the direction from winding terminal U to winding terminal V. After a so-called "current-flow gap," which is also referred to as a "commutation gap" or "dead time," commutation signal HSR is toggled from "HIGH" to "LOW" and commutation signal LSL is toggled from "LOW" to "HIGH." Semiconductor switches 196 and 194 are thereby switched on, and current can flow from winding terminal V to winding terminal U. The commutation operation at instant $t_{COMMUT\_1}$ is thereby completed. The current-flow gap, between the switching-on and switching-off operations that are performed, is produced in order to reliably prevent a short circuit of the full bridge circuit of power stage 122.

Once the minimum rotation speed n_min of ECM 120 is reached, the charge state of link circuit capacitor 178 is continuously determined. This can already be done from the time ECM 120 is switched on, but becomes necessary for specifying, after each commutation, suitable commutation instants, once the minimum rotation speed has been reached.

To determine the charge state of link circuit capacitor 178, the voltage drop at resistor 140 generated by the recharge current I_RC (I_RECHARGE) is continuously sensed. This voltage drop allows an inference as to whether, and for how long, a recharge current is flowing into capacitor 178; a precise determination of the amplitude of the recharge current is not absolutely necessary. The sensitivity with which the recharge current is detected, i.e. its minimum detectable amplitude, can be set by appropriately selecting resistor 140 and measurement apparatus 160.

Be it noted that the selection of resistor 140 also influences the EMC (electromagnetic compatibility) interference emission. The larger the resistor 140 that is selected, the smaller the filter effect of capacitor 178. The size of resistor 140 also influences the service life of capacitor 178. The higher the resistance of resistor 140, the lower the recharge current into capacitor 178 and the longer the service life of capacitor 178.

According to a preferred embodiment, transistor 160 (functioning as a threshold value switch) becomes conductive whenever the voltage drop at resistor 140 exceeds a predetermined threshold value. As a result, the logic signal RCI present at the input of microprocessor 130 becomes logical "LOW." Once the recharge current has decayed, transistor 160 blocks and signal RCI becomes "HIGH."

The magnitude of the threshold value corresponds, in this embodiment, to the base-emitter voltage of the switched-on transistor 160, and is equal to approximately 0.5 V. Depending on the selection of resistor 140, the threshold value is reached at different recharge current levels. With a smaller (lower-resistance) resistor 140, a higher recharge current is needed to achieve a voltage drop corresponding to the switch-on voltage.

This higher recharge current occurs in a context of late commutation and as a result of smaller ignition advance angles. The desired ignition advance can also be set via resistor 140. The larger the resistor 140 that is selected, the longer the service life of capacitor 178.

By evaluating the logic signal RCI, microprocessor 130 determines a time period during which the recharge current I_RC is above a threshold value, and during which the current is accordingly charging link circuit capacitor 178. This time period extends substantially from the end of one commutation operation to the earliest instant at which the voltage drop (dependent on the recharge process) at resistor 140 drops below the predetermined threshold value, and corresponds to the time span during which signal RCI is logically "LOW." As a function of this time period, and other suitable actions that are described below with reference to FIG. 8, the microprocessor specifies suitable commutation instants $t_{COMMUT}$ for ECM 120, at which instants commutation signals HSR, LSL, HSL, LSR of semiconductor switches 196, 194, 192, 198 are toggled as described above.

According to a preferred embodiment, the suitable commutation instants are calculated in an indirect way by determining current-flow time durations. When a recharge current occurs after a commutation operation, it is assumed that a previously ascertained current-flow time period was too long, and needs to be shortened by a predetermined amount. If no recharge occurs, the current-flow time duration was tending toward being too short, and accordingly is lengthened by a predetermined amount. As mentioned above, the predetermined amount by which the current-flow time period is shortened or lengthened is preferably specified as a function of various operating parameters such as the recharge duration, supply voltage, motor current, acceleration, deceleration, and/or a target value definition, in order to optimize the motor.

The commutation of ECM 120 can thus be optimized as a function of the current I_RC recharged into link circuit 170, with the result that the recharged current also is minimized. Commutation then automatically synchronizes itself to an optimum, or at least good, current-flow time period, without the use of additional sensors for direct measurement of rotor position.

Experiments have shown that with ECM 120 in a steady state, i.e. after the recharge current has been reduced, commutation occurs in the form of a so-called time-advanced commutation ("ignition advance") with improved power output, improved efficiency, and improved EMC properties. In particular, minimization of the recharged current reduces the current load on link circuit capacitor 178 and extends its service life, which is then influenced mainly by the ambient temperature and effective current.

FIG. 2 is a simplified circuit diagram that schematically illustrates the functioning of an apparatus 200 for operating ECM 120 of FIG. 1, according to a further embodiment. Apparatus 200 corresponds substantially to apparatus 100 of FIG. 1, and it is in particular the differences that are described.

Lead 112 has two nodal points 103, 104, and lead 116 has two points 105, 108. In contrast to apparatus 100, however, apparatus 200 has an arrangement 152' for sensing the recharge into link circuit capacitor 178, which arrangement determines the charge state of link circuit capacitor 178 using a comparator 157. The latter is connected to points 103 and 105 for the delivery of supply voltage $U_b$. A resistor 153 (R4) is located between point 103 and a point 159, and a resistor 155 (R5) between point 159 and point 108. Point 159 is connected to the non-inverting input (+) of comparator 157 and specifies to the latter a threshold value defined by voltage divider 153, 155. The inverting input (−) of comparator 157 is connected to nodal point 158, and the output to the input of microprocessor 130.

Comparator 157 compares the potentials at nodal points 158 and 159, and generates signal RCI as a function of the result of the comparison. Signal RCI becomes "LOW" when the potential at nodal point 159 is lower than the potential at nodal point 158. This is preferably the case when the charge state of link circuit capacitor 178 is being influenced by a recharged current, and when a voltage drop is occurring at resistor 140. Otherwise the signal RCI generated by comparator 157 is "HIGH."

With the use of comparator 157, the threshold value can be set more precisely, and at a lower value, than when transistor 160 of FIG. 1 is used. This enables the effective current of link circuit capacitor 178, and the time-advanced commutation performed once a steady state is reached, to be set relatively independently of one another. Because of the greater gain of comparator 157, resistor 140 can be dimensioned to be smaller than in the case of FIG. 1, so that the filter effect of capacitor 178 is increased and EMC interference emission is diminished.

FIG. 3 is a schematic depiction 300 of an exemplifying time course of operating parameters 310, 320, 330, 340 that are measured, during the operation of apparatus 100 of FIG. 1 or apparatus 200 of FIG. 2, in the context of a commutation optimized according to an embodiment. Operating parameter 310 illustrates the winding current I in stator winding 126, which current can also be referred to as a substitute Hall signal; 320 illustrates the commutation status of ECM 120; 330 illustrates the voltage induced into stator winding 126; and 340 illustrates the (positive) current recharged into capacitor 178 (shown as positive values) or the (negative) current fed out of capacitor 178.

Commutation status 320 exhibits, by way of example, two different levels: logical "LOW" and "HIGH." At each level change, i.e. at commutation instants 322, 324, 326, a commutation operation is performed. After the commutation operation at commutation instants 322, 324, 326, current 340 has positive current peaks 342', 344', 346', i.e. a current flows from ECM 120 into link circuit capacitor 178. Current 340 subsequently decays to zero, and a current then flows in the opposite direction (negative) from capacitor 178 to ECM 120 until said current also, after a time period, decays back to zero. In the case of current peak 342', the time period from commutation instant 322 to completion of the first recharge current or to the first zero transition (recharge time duration) is labeled 350', and the time period from commutation instant 322 to the second zero transition, i.e. until link circuit capacitor 178 has returned the stored energy, is labeled 350. Time periods 350' and 350 can be referred to in general as decay time periods.

FIG. 3 illustrates a substantially optimum commutation of ECM 120, which commutation is in this case a time-advanced commutation in which commutation instants 322, 324, 326 each occur with a so-called ignition advance of 20° el. This results in an approximately minimal (recharge) current 340, in terms of both the maximum amplitude at commutation instant 322 and the decay time duration 350' or 350. This is illustrated by the uniformity and symmetry of winding current 310, which is largely free of undesirable current peaks and thus results in reduced EMC interference.

FIG. 4 shows a schematic depiction 400 of an exemplifying time course of a winding current 410, a commutation status 420, an induced voltage 430, and a recharge current 440, which are measured during the operation of apparatus 100 of FIG. 1 or apparatus 200 of FIG. 2 in the context of a commutation that is not advanced or retarded. FIG. 4 accordingly illustrates winding current 410 and the recharged current 440 in the context of a commutation of ECM 120 at commutation instants 422, 424, 426 that are not optimized according to the present invention.

At commutation instants 422, 424, 426, current peaks 442', 444', 446' occur in recharge current 440; in terms of current intensity, these peaks are approximately 50% higher than current peaks 342', 344', 346' that occur in the context of the optimized time-advanced commutation according to FIG. 3. These current peaks 442', 444', 446' require, for decay, a time duration 450' or 450 that is approximately 50% longer than in FIG. 3. FIG. 4 depicts, by way of example, a recharge time period (decay time duration) 450', 450 for comparison with recharge time period 350', 350 of FIG. 3. Winding current 410 has, at commutation instants 422, 424, 436, current peaks 412, 414, 416 that result in undesirable EMC interference signals.

FIG. 5 is a schematic depiction 500 of an exemplifying profile of a winding current 510, a commutation status 520, an induced voltage 530, and a recharge current 540 that are measured during the operation of apparatus 100 of FIG. 1 and apparatus 200 of FIG. 2 in the context of a commutation delayed by 10° el.

At commutation instant 524, a current peak 544' occurs in recharge current 540 after commutation; this peak is approximately twice as large as current peaks 342', 344', 346' of FIG. 3. This current peak 544' requires, for its decay, a time duration 550', 550 that is approximately three times as long as the time duration required for the decay of current peaks 342', 344', 346' according to FIG. 3 (compare time period 350', 350 of FIG. 3). Winding current 510 also exhibits, at commutation instant 524, a current peak 514 that is approximately twice as high as current peak 414 in winding current 410, and thus results in an even stronger undesirable EMC interference. The asymmetry of recharge current 540 results from the fact that the ignition angle at commutation instants 522, 526 is approximately 0° el., and at commutation instant 524 is +10° el. (ignition retard). The ignition retard is also evident from the fact that induced voltage 530 has its zero transition prior to commutation instant 524. The zero transition of the induced voltage corresponds to an ignition angle of 0° el.

FIG. 6 shows a schematic depiction 600 with winding current 510, commutation status 520, induced voltage 530, and recharge current 540 of FIG. 5, in which commutation status 520 is emphasized for elucidation of the commutation operations performed at commutation instants 522, 524, and 526.

At commutation instant 522 ($t_{COMMUT\_1}$), a first commutation operation is initiated in which, for example, semiconductor switches 192 and 198 are switched off and semiconductor switches 194 and 196 are switched on, in which context commutation status 520 changes from "LOW" to "HIGH." As a result, stator phase winding strand 126 experiences current flow via semiconductor switches 194 and 196, for a current-flow time period 612 ($T_{CF}(1)$) until commutation instant 524 ($t_{COMMUT\_2}$), at which a second commutation operation with an ignition retard of 10° el. is initiated. Here semiconductor switches 194 and 196 are switched off and semiconductor switches 192 and 198 are switched on, in which context commutation status 520 changes from "HIGH" to "LOW." As a result, stator phase winding strand 126 experiences current flow via semiconductor switches 192 and 198 for a current-flow time period 662 ($T_{CF}(2)$) until commutation instant 526 ($t_{COMMUT\_3}$).

Because peak 544' of recharge current 540 (cf. FIG. 5) is very large in the context of the second commutation operation, since commutation took place too late, current-flow time period $T_{CF}(2)$ is decreased so as thereby to reduce a peak 646, occurring at commutation instant 526, in recharge current 540. An exemplifying method for determining suitable current-flow durations and commutation instants is described below with reference to FIG. 8.

FIG. 7 is a flow diagram of a method 700 for operating apparatus 100 of FIG. 1 and apparatus 200 of FIG. 2, according to a preferred embodiment. Method 700 is executed as a main program of control unit 132 in the form of an infinite loop, the execution of which begins each time ECM 120 is started up after an initialization and after acceleration to a predetermined minimum rotation speed, and then ends only when operation is interrupted or terminated.

Initialization of the main program is accomplished in an "Init" subroutine that is executed in step S710, control unit 132 being initialized with its inputs and outputs and the requisite control variables. In step S710, for example, the inputs and outputs of microprocessor 130 are initialized, and a predetermined current-flow time period ($T_{CF}(n)$) is set. A "Startup" subroutine is then executed in step S720 to ramp up ECM 120, in order to accelerate it, for example in stepping-motor mode with forced commutations as described above, to the necessary minimum speed. After a predetermined number of forced commutations, execution leaves the "Startup" subroutine, and execution of the infinite loop of the main program begins in step S730.

Step S730 checks whether the present current-flow time period $T_{CF}(n)$ has elapsed. This is done by comparing the latter with a time variable $T_{TIMER}$ that senses the respective time span from the most recently performed commutation operation up to the present point in time. The time variable $T_{TIMER}$ is ascertained, for example, using a suitable timer that is implemented by control unit 132. If $T_{TIMER} \geq T_{CF}(n)$, the current-flow time period $T_{CF}(n)$ that was set has elapsed. In that case, the main program calls, in step S740, a "Commutate" subroutine that performs a commutation operation as described above. Otherwise the main program waits in step S730. Once commutation operation S740 has been performed, the main program continues in step S750.

Be it noted that any suitable subroutine can be used to initialize and ramp up ECM 120. Because such subroutines are sufficiently known from the existing art, a detailed description of examples of subroutines is omitted here.

In step S750, the main program calls a "Charge Check" subroutine to determine a suitable current-flow time period that defines a commutation instant for performing the next commutation operation. An example of a "Charge Check" subroutine is described below with reference to FIG. 8. After execution of this subroutine, the main program of FIG. 7 returns to step S730. The current-flow time period is thus determined afresh after each commutation operation, and thus automatically optimizes itself as described above.

The triggering of commutation operation S740 can preferably also be achieved by way of a timer interrupt, if such an interrupt is made available by the microprocessor.

FIG. 8 is a flow diagram of a method 800 with which the "Charge Check" subroutine in step S750 of the main program of FIG. 7 can be executed. The "Charge Check" subroutine begins, after each commutation operation is performed, with step S810 in which time variable $T_{TIMER}$ of the timer of μC 130 is reset to zero.

In step S815, a difference $\Delta T_{CF}$ is determined between the preceding current-flow time duration $T_{CF}(-1)$ and the present current-flow time duration $T_{CF}(n)$, yielding $\Delta T_{CF} := T_{CF}(-1) - T_{CF}(n)$. In step S820, the value $T_{CF}(-1)$ is overwritten with the value $T_{CF}(n)$.

Step S825 checks whether signal RCI present at microprocessor 130 is logically "LOW," i.e. whether a recharge current is flowing from stator winding strand 126 into DC link circuit 170. If signal RCI is logically "LOW," the "Charge Check" subroutine continues with step S830; otherwise it goes to S850.

Step S830 checks whether signal RCI is logically "HIGH." If signal RCI is logically "HIGH," the "Charge Check" subroutine continues with step S835. Otherwise, it waits in step S830 until signal RCI becomes logically "HIGH." Step S830 accordingly serves to determine the point in time at which the recharge current has decayed and signal RCI changes from logical "LOW" to logical "HIGH."

In step S835, a time duration $T_{CT}$ is determined which describes the recharge duration, and thus extends from the occurrence of the recharge current to its decay. This time duration can be ascertained by determining a time span that extends substantially from the end of the most recently performed commutation operation to the earliest point in time at which a current value dependent on the charge state of link circuit capacitor 178 is below a predetermined current threshold. The determination of time period $T_{CT}$ is accomplished by assigning to that earliest point in time the present value of the time variable $T_{TIMER}$.

Because $T_{CT}$ is, in this case, greater than zero (because a recharge current was sensed), commutation was tending toward being too late, and the current-flow time duration $T_{CF}(n)$ is decreased in step S840 by an amount equal to a correction value $T_{CORRECT}$; the "Charge Check" subroutine then continues with step S860.

In step S850 the time period $T_{CT}$ is set to zero, since no return current was sensed. Because this means (as described above) that commutation was tending toward being too early, the current-flow time duration $T_{CF}(n)$ is increased in step S855 by an amount equal to the correction value $T_{CORRECT}$; the "Charge Check" subroutine then continues with step S860.

In the present embodiment, the correction value $T_{CORRECT}$ is determined using a lookup table that is stored, for example, in a storage unit of control unit 132 suitable therefor. A suitable lookup table can be ascertained by performing appropriate laboratory experiments. Graphic depictions of an example of a lookup table are described with reference to FIGS. 9 and 10.

In step 860, the current-flow time period $T_{CF}(n)$ is reduced by an amount equal to the difference value $\Delta T_{CF}$. This produces a D component upon generation of the current-flow time duration $T_{CF}(n)$. In step S865, the current-flow time duration $T_{CF}(n)$ is finally reduced by an amount equal to the time period $T_{CT}$; the "Charge Check" subroutine then terminates, and the main program of FIG. 7 returns to step S730.

FIG. 9 shows a schematic depiction 900 of an exemplifying profile of current-flow time durations 920 and associated correction values 910 as a function of the rotation speed of ECM 120 of FIG. 1 and FIG. 2. A predetermined correction value $T_{CORRECT}$ is allocated to each specific current-flow time duration $T_{CF}(n)$. For example, a current-flow time duration 922 of 10 ms at a rotation speed n=1500 rpm has a correction value (Syncvar) 912 of approximately 15.1 μs allocated to it.

As is apparent from FIG. 9, correction value 910 decreases monotonically as the rotation speed n of ECM 120 rises.

Shown below is a table of the correction values (Syncvar) as a function of rotation speed n and the time duration KZ between two successive commutation instants, for a four-pole rotor:

| n (rpm) | Time KZ (ms) | Syncvar |
|---|---|---|
| 500 | 30.000 | 8.51E−4 |
| 1000 | 15.000 | 3.47E−4 |
| 1500 | 10.000 | 1.51E−4 |
| 2000 | 7.500 | 6.17E−5 |
| 2500 | 6.000 | 2.57E−5 |
| 3000 | 5.000 | 1.05E−5 |
| 3500 | 4.286 | 4.37E−6 |
| 4000 | 3.750 | 1.74E−6 |
| 4500 | 3.333 | 7.24E−7 |
| 5000 | 3.000 | 2.95E−7 |
| 5500 | 2.727 | 1.26E−7 |
| 6000 | 2.500 | 5.25E−8 |
| 6500 | 2.308 | 2.14E−8 |
| 7000 | 2.143 | 8.91E−9 |
| 7500 | 2.000 | 3.80E−9 |

FIG. 10 is a schematic depiction 1000 of an exemplifying profile of rotation speeds 1020 of ECM 120 of FIG. 1 and FIG. 2 and associated correction values 1010 as a function of current-flow time duration $T_{CF}(n)$, a predetermined correction value $T_{CORRECT}$(Syncvar) being allocated to each specific rotation speed n. For example, a rotation speed 1022 of approximately 1000 rpm with a current-flow time duration of 15 ms has a correction value 1012 of approximately 34.7 μs allocated to it.

FIG. 11 is a schematic depiction 1100 of an exemplifying time course of operating parameters 1110, 1120, 1130, 1140 that are measured, during the operation of apparatus 100 of FIG. 1 and apparatus 200 of FIG. 2, in the context of a commutation, according to an embodiment. Operating parameter 1120 illustrates the commutation status of ECM 120, 1130 the voltage induced in stator winding strand 126 in the context of the commutation operations, 1140 the current recharged into DC link circuit 170, and 1110 a corresponding recharge status.

FIG. 11 illustrates automatic optimization of the commutation of ECM 120, also referred to as the achievement of a "steady state." Here recharge status 1110 characterizes instants at which the voltage drop at resistor 140 exceeds a predetermined threshold value, and a recharge flow is thus sensed. A recharge current is accordingly sensed at instants 1112, 1114, 1116, 1118, 1119, and no further recharge current is sensed after commutation instant 1122 in the context of commutation, since the predetermined threshold value is no longer being exceeded. As of instant 1122, ECM 120 is thus being operated in the steady state.

FIG. 12 is a schematic depiction 1200 of an exemplifying time course of operating parameters 1210, 1220, 1230, 1240 that are measured during the ramp-up of apparatus 100 of FIG. 1 and apparatus 200 of FIG. 2. Operating parameter 1220 illustrates rotation speed n of ECM 120; 1230 illustrates the respective current-flow time periods $T_{CF}(n)$; 1240 illustrates the corresponding difference values $\Delta T_{CF}$; and 1210 illustrates the respective recharge time durations $T_{CT}$.

As is apparent from FIG. 12, the recharge time duration $T_{CT}$ becomes shorter with increasing rotation speed n. The current-flow time duration $T_{CF}(n)$ approaches a lower limit value that represents an optimum current-flow time duration. The difference value $\Delta T_{CF}$ and recharge time periods $T_{CT}$ accordingly become continuously lower.

Many variants and modifications are of course possible within the scope of the present invention.

For example, it is possible to measure the recharge into DC link circuit capacitor 178 in different ways. Whereas in the exemplifying embodiments according to FIG. 1 and FIG. 2 the recharge was ascertained by way of the current flowing to capacitor 178, the measurement can also be accomplished by way of the voltage present at capacitor 178, which voltage rises as capacitor 178 is charged by a current I_RC flowing to it. This is done preferably by picking off the voltage present at capacitor 178 and delivering that voltage to a differentiating member. The signal resulting therefrom can be compared with a threshold value, and the result delivered to a μC 130 for evaluation.

If a μC 130 having an A/D converter is used, in all the exemplifying embodiments the charge state of the capacitor ascertained in analog fashion can be delivered directly to the A/D converter of μC 130 for evaluation. A pre-evaluation, such as that occurring with transistor 160 in FIG. 1 and with comparator 157 in FIG. 2, can then be omitted.

It is also possible to set the ignition advance angle by, for example, defining resistor 140 (FIGS. 1 and 2) or the threshold value of the comparator (FIG. 2) in correspondingly variable fashion. Definition is performed preferably by means of μC 130. In preferred fashion, it is possible to set the ignition angle in the range from −20° el. to +10° el. by means of such a circuit. This setting is preferably accomplished variably, and in additionally preferred fashion the setting of the ignition advance angle is controlled by the μC. Indirect definition of the ignition angle also allows a rotation speed control capability to be achieved.

What is claimed is:

1. A method of operating an electric motor (120) having
   a rotor (124),
   a stator (125) with at least one phase winding strand (126),
   a power stage (122) for influencing the current flow in said phase winding strand,
   a DC link circuit (170) for supplying the power stage with current, the link circuit including a link circuit capacitor (178) which intermittently receives a recharge current; and
   a measuring element (152, 152') which serves to ascertain the current to and from said link circuit capacitor (178) and to generate therefrom a corresponding output signal;
   said method comprising the steps of:
   performing (S740) a commutation operation in the power stage (122), at predetermined commutation instants ($t_{COMMUT\_1}$, $t_{COMMUT\_2}$, $t_{COMMUT\_3}$); and
   specifying (S750) said commutation instants ($t_{COMMUT\_1}$, $t_{COMMUT\_2}$, $t_{COMMUT\_3}$) as a function of said output signal.

2. The method according to claim 1, further comprising the steps of:
   performing a first commutation operation (524);
   specifying (S750) a current-flow time duration ($T_{CF}(2)$) between the first commutation operation (524) and a second commutation operation (526) as a function of a recharge operation into the link circuit capacitor (178) after the first commutation operation (524); and
   initiating a second commutation operation (526) after the current-flow time duration ($T_{CF}(2)$) has elapsed.

3. The method according to claim 2, further comprising specifying (S865) the current-flow time duration ($T_{CF}(2)$) as a function of a first time duration ($T_{CT}$) that extends substantially from the end of the first commutation operation (524) to the earliest point in time (550) at which a current value, dependent on the recharge operation into the link circuit capacitor (178), lies below a predetermined current limit value.

4. The method according to claim 3, further comprising ascertaining said current value by measuring the voltage drop at a resistor (140) connected in series with the link circuit capacitor (178).

5. The method according to claim 3, further comprising ascertaining the current value by differentiating a voltage present at the link circuit capacitor (178).

6. The method according to claim 3, wherein the current limit value is substantially zero.

7. The method according to claim 3, further comprising decreasing (S840) the current-flow time duration ($T_{CF}(2)$) with respect to a preceding current-flow time duration ($T_{CF}(1)$) by a predetermined decrease amount ($T_{CORRECT}$) when the first time duration ($T_{CT}$) is greater than a predetermined limit time duration.

8. The method according to claim 7, wherein the predetermined limit time duration equals zero.

9. The method according to claim 7, wherein the predetermined limit time duration is dependent upon a rotation speed of said rotor (124).

10. The method according to claim 7, wherein the predetermined decrease amount ($T_{CORRECT}$) is dependent upon the first time duration ($T_{CT}$).

11. The method according to claim 7, wherein the predetermined decrease amount ($T_{CORRECT}$) is dependent upon the rotation speed.

12. The method according to claim 3, wherein the current-flow time duration ($T_{CF}(2)$) is increased (S855) with respect to a preceding current-flow time duration ($T_{CF}(1)$) by a predetermined increase amount ($T_{CORRECT}$) when the first time duration ($T_{CT}$) equals zero.

13. The method according to claim 12, wherein the predetermined increase amount ($T_{CORRECT}$) is dependent on the rotation speed.

14. The method according to claim 1, further comprising performing said steps in a single-phase motor.

15. The method according to claim 1, further comprising performing said steps in a motor having a single winding strand.

16. An electric motor which comprises
    a rotor (124),
    a stator (125) having at least one winding strand (126),
    a power stage (122) for influencing the current flow in said winding strand,
    a DC link circuit (170) that serves for supplying the power stage (122) with current, the link circuit including a link circuit capacitor (178) which intermittently receives a recharge current; and
    a control unit (132) having an arrangement (152) for sensing a value characterizing the current into and out of the link circuit capacitor (178), said control unit (132) being configured to specify commutation instants ($t_{COMMUT\_1}$, $t_{COMMUT\_2}$, $t_{COMMUT\_3}$) as a function of the sensed value, and to perform commutation operations in the power stage (122) at the commutation instants ($t_{COMMUT\_1}$, $t_{COMMUT\_2}$, $t_{COMMUT\_3}$) that are specified.

17. The motor according to claim 16, wherein the power stage (122) comprises a full bridge circuit having semiconductor switches (192, 194, 196, 198) that are controllable by the control unit (132) in order to influence the current flow in the at least one phase winding strand (126) of the stator (125).

18. The motor according to claim 16, wherein the arrangement (152) for sensing the value characterizing the current recharge into the link circuit capacitor (178) comprises a resistor (140), connected in series with the link circuit capacitor (178), for sensing the value on the basis of the voltage drop at said resistor (140).

19. The motor according to claim 18, wherein the arrangement (152) for sensing the value characterizing the current recharge into the link circuit capacitor (178) comprises a signal generator (160, 157) that generates a signal (RCI) dependent on the current recharge.

20. The motor according to claim 19, wherein the signal (RCI) that is generated assumes a first value (RCI=LOW) when the voltage drop at the resistor (140) exceeds a predetermined threshold value.

21. The motor according to claim 20, wherein the signal (RCI) that is generated assumes a second value (RCI=HIGH) when the voltage drop at the resistor (140) falls below the predetermined threshold value.

22. The motor according to claim 19, wherein
the signal generator (160, 157) comprises a transistor configured as a threshold value switch.

23. The motor according to claim 19, wherein
the signal generator (160, 157) comprises a comparator.

24. The motor according to claim 19, wherein
the control unit (132) is configured to specify the commutation instants ($t_{COMMUT\_1}$, $t_{COMMUT\_2}$, $t_{COMMUT\_3}$) as a function of the recharge-current-dependent signal (RCI) that is generated.

25. The motor according to claim 16, wherein
the control unit (132) comprises a microprocessor (130) which is adapted to initiate commutation operations in the power stage (122) at the commutation instants ($t_{COMMUT\_1}$, $t_{COMMUT\_2}$, $t_{COMMUT\_3}$) that are specified.

26. The motor according to claim 25, wherein
the microprocessor (130) is configured to specify, after initiation of a first commutation operation (524) and as a function of the charge state of the link circuit capacitor (178), a current-flow time duration ($T_{CF}(2)$) between said first commutation operation (524) and a second commutation operation (526), and to initiate said second commutation operation (526) after the current-flow time duration ($T_{CF}(2)$) has elapsed.

27. The motor according to claim 16,
which is a single-phase motor.

28. The motor according to claim 16,
which is a motor having a single phase winding strand.

29. The motor according to claim 16, further comprising
a diode (182) provided in the DC link circuit (170), which diode is implemented to prevent a recharge current into a DC voltage source (184, 186) connected to the DC link circuit (170).

30. The motor according to claim 16, wherein
the control unit (132) is configured to carry out a method comprising steps of:
performing a first commutation operation (524);
specifying (S750) a current-flow time duration ($T_{CF}(2)$) between the first commutation operation (524) and a second commutation operation (526) as a function of a recharge operation into the link circuit capacitor (178) after the first commutation operation (524); and
initiating a second commutation operation (526) after the current-flow time duration ($T_{CF}(2)$) has elapsed.

31. An electric motor comprising
a rotor (124),
a stator (125) having at least one winding strand (126),
a power stage (122) for influencing the current flow in said winding strand,
a DC link circuit (170) supplying the power stage (122) with current, and
a measuring element (152, 152') which serves to ascertain the current to and from said link circuit capacitor (178) and to generate therefrom a corresponding output signal; and
a control unit (132) which is configured to specify commutation instants ($t_{COMMUT\_1}$, $t_{COMMUT\_2}$, $t_{COMMUT\_3}$) as a function of said output signal, and to perform commutation operations in the power stage (122) at the commutation instants ($t_{COMMUT\_1}$, $t_{COMMUT\_2}$, $t_{COMMUT\_3}$) that are specified.

* * * * *